US010601326B2

(12) United States Patent
Lee et al.

(10) Patent No.: US 10,601,326 B2
(45) Date of Patent: Mar. 24, 2020

(54) LOW VOLTAGE STRESS FLYBACK CONVERTER WITH CONTINUOUS INPUT CURRENT

(71) Applicants: KOREA AEROSPACE RESEARCH INSTITUTE, Daejeon (KR); KOOKMIN UNIVERSITY INDUSTRY ACADEMY COOPERATION FOUNDATION, Seoul (KR)

(72) Inventors: Na Young Lee, Daejeon (KR); Jae Dong Choi, Daejeon (KR); Sang Kyoo Han, Seoul (KR); Ju Young Lee, Seoul (KR)

(73) Assignees: Korea Aerospace Research Institute, Daejeon (KR); Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 16/420,556

(22) Filed: May 23, 2019

(65) Prior Publication Data
US 2019/0363632 A1    Nov. 28, 2019

(30) Foreign Application Priority Data

May 25, 2018   (KR) .......................... 10-2018-0059756

(51) Int. Cl.
*H02M 3/335*   (2006.01)
*H02M 1/14*    (2006.01)
(Continued)

(52) U.S. Cl.
CPC .......... *H02M 3/3353* (2013.01); *H02M 1/14* (2013.01); *H02M 1/44* (2013.01); *H02M 2001/0003* (2013.01)

(58) Field of Classification Search
CPC ........... H02M 3/3353; H02M 3/33507; H02M 3/33523; H02M 3/335; H02M 1/14;
(Continued)

(56) References Cited

U.S. PATENT DOCUMENTS 5,694,302  A       12/1997  Faulk
6,295,213  B1 *    9/2001   Smith ............... H02M 3/33569
                                                           363/21.01
(Continued)

FOREIGN PATENT DOCUMENTS

KR    1020100027931 A    3/2010
KR    101248807 B1       4/2013

*Primary Examiner* — Adolf D Berhane
*Assistant Examiner* — Nusrat Quddus
(74) *Attorney, Agent, or Firm* — Rabin & Berdo, P.C.

(57) ABSTRACT

A flyback converter is provided, which includes a transformer comprising a primary winding and a secondary winding, the transformer for transforming a power inputted from an input power supply and outputting the transformed power, a switching part having one end connected to the primary winding and the other end connected to the input power supply, and an auxiliary circuit including an auxiliary capacitor, and an auxiliary winding coupled to the primary winding. In addition, a clamping diode and a two-series connected switch structure is utilized for the switch stage to relieve the voltage stress of the switch. Accordingly, it is possible to reduce the voltage stress of the switch and also reduce the ripple of the input current which are the causes of EMI.

3 Claims, 8 Drawing Sheets

(51) Int. Cl.
*H02M 1/44* (2007.01)
*H02M 1/00* (2006.01)

(58) Field of Classification Search
CPC ............ H02M 1/44; H02M 1/08; H02M 1/34;
H02M 2001/344; H02M 2001/0009;
H02M 2001/0048
See application file for complete search history.

(56) References Cited

U.S. PATENT DOCUMENTS

| | | | |
|---|---|---|---|
| 8,000,112 B2* | 8/2011 | Zhang | H02M 1/34 363/21.01 |
| 9,048,738 B2* | 6/2015 | Lv | H02M 3/33569 363/21.04 |
| 9,326,336 B2* | 4/2016 | Knoedgen | H05B 33/0815 |
| 9,935,556 B1* | 4/2018 | Rana | H02M 3/33507 |
| 9,991,803 B1* | 6/2018 | Wang | H02M 3/33507 |
| 10,177,668 B2* | 1/2019 | Song | H02M 3/33507 |
| 2018/0062529 A1* | 3/2018 | Song | H02M 3/33507 |
| 2019/0173385 A1* | 6/2019 | Park | H02M 1/14 |

* cited by examiner

Prior Art

Prior Art

LOW VOLTAGE STRESS FLYBACK CONVERTER WITH CONTINUOUS INPUT CURRENT

CROSS-REFERENCE TO RELATED APPLICATIONS

The present disclosure claims priority to Korean Patent Application No. 10-2018-0059756 in the Republic of Korea, the disclosures of which are incorporated herein by reference.

BACKGROUND

1. Field of the Disclosure

The present disclosure relates to a flyback converter.

2. Description of the Related Art

FIG. 1 is a circuit diagram showing a conventional flyback converter.

The flyback type scheme as illustrated in FIG. 1 may be used as a low-power DC-DC converter of 50 W or less used for secondary power conversion of geostationary satellites. Such flyback converter has an input current in a pulse shape and thus requires an EMI filter to meet the satellite electro magnetic interference (EMI) requirements. In addition, considering the increasing satellite input voltage that is almost doubled from the typical input voltage in order to effectively manage the rapidly increasing satellite power consumption, the voltage stress of a switch for the converter is also increasing. An increase in the voltage stress of the switch leads to a demand for a switch that has a larger conduction resistance, which causes an increase in converter conduction loss. In addition, the switching loss also increases for each switching operation, which is caused by overlapping of the switch voltage and the current. In this way, the power loss at the switch can be increased when designing a high-frequency switching required for miniaturization of the converter size and therefore, it is very important to reduce the voltage stress when designing a high-density converter.

SUMMARY

Accordingly, it is an object of the present disclosure to provide a flyback converter capable of reducing a voltage stress of the switch, while also reducing a ripple of an input current which are causes of EMI.

According to an aspect of the present disclosure, there is provided a flyback converter including a transformer comprising a primary winding and a secondary winding, the transformer for transforming a power inputted from an input power supply and outputting the transformed power, a switching part having one end connected to the primary winding and the other end connected to a ground of the input power supply, and an auxiliary circuit including an auxiliary capacitor, and an auxiliary winding coupled to the primary winding.

The auxiliary circuit may be connected to the switching part in parallel.

The auxiliary capacitor and the auxiliary winding may be connected to each other in series.

The auxiliary winding may be connected to a contact of the primary winding and the switching part, and one end of the auxiliary capacitor may be connected to the other end of the switching part.

The flyback converter may additionally include a clamping diode, The switching part may include a first switch and a second switch connected to each other in series, an anode of the clamping diode may be connected to a contact of the first switch and the second switch, and a cathode of the clamping diode may be connected to a contact of the auxiliary winding and the auxiliary capacitor.

The auxiliary winding and the primary winding may have a same number of windings.

The flyback converter may be operated based on a first mode and a second mode.

In the first mode, the switching part may be turned on and energy may be stored in a magnetizing inductance of the transformer.

In the second mode, the switching unit may be turned off and the energy stored in the magnetizing inductance of the transformer may be transferred to a secondary side.

According to the present disclosure, it is possible to reduce the voltage stress of the switch while also reducing the ripple of the input current which are the causes of EMI.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
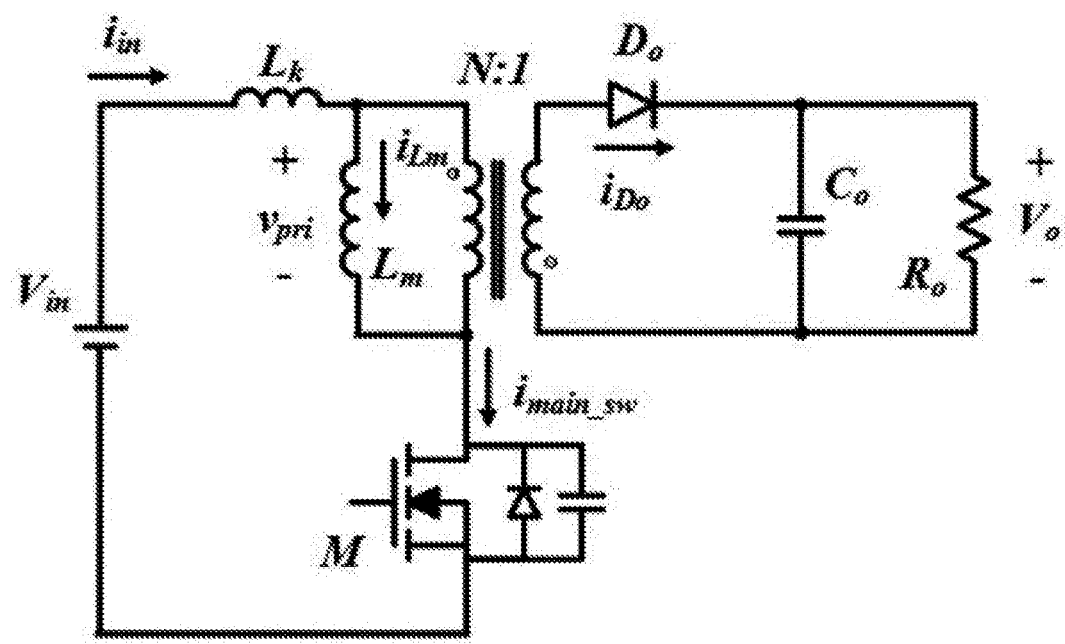
FIG. 1 is a circuit diagram showing a conventional flyback converter.

Hereinafter, preferred embodiments of the present disclosure that can be easily carried out by those skilled in the art to which the present disclosure belongs will be described in detail with reference to the accompanying drawings. It will be apparent to those skilled in the art, however, that these examples are provided to further illustrate the present disclosure, and the scope of the present disclosure is not limited thereto.

It is to be understood that the configuration of the disclosure for elucidating the solution of the problem according to the present disclosure will be described in detail with reference to the accompanying drawings based on the preferred embodiment of the present disclosure, while designating the same or like components illustrated in the drawings with the same reference numerals even in different drawings, and that components from different drawings may be cited in describing a certain drawing as necessary. In addition, in explaining the operation principle of the preferred embodiments of the present disclosure in detail, when it is determined that the detailed description of the known function or configuration related to the present disclosure and other matters may unnecessarily obscure the gist of the present disclosure, detailed description thereof will be omitted.

Further, throughout the description, when a portion is stated as being "connected" to another portion, it intends to include not only an example where the portions are "directly connected", but also an example where the portions are "indirectly connected" while having another element therebetween. Throughout the description, singular forms include plural forms unless the context clearly dictates otherwise. The terms "comprises" or "comprising" used in the specification does not exclude the presence or addition of one or more other components, steps, operations, or elements in addition to the mentioned component, step, operation, or element.

Figure 2:
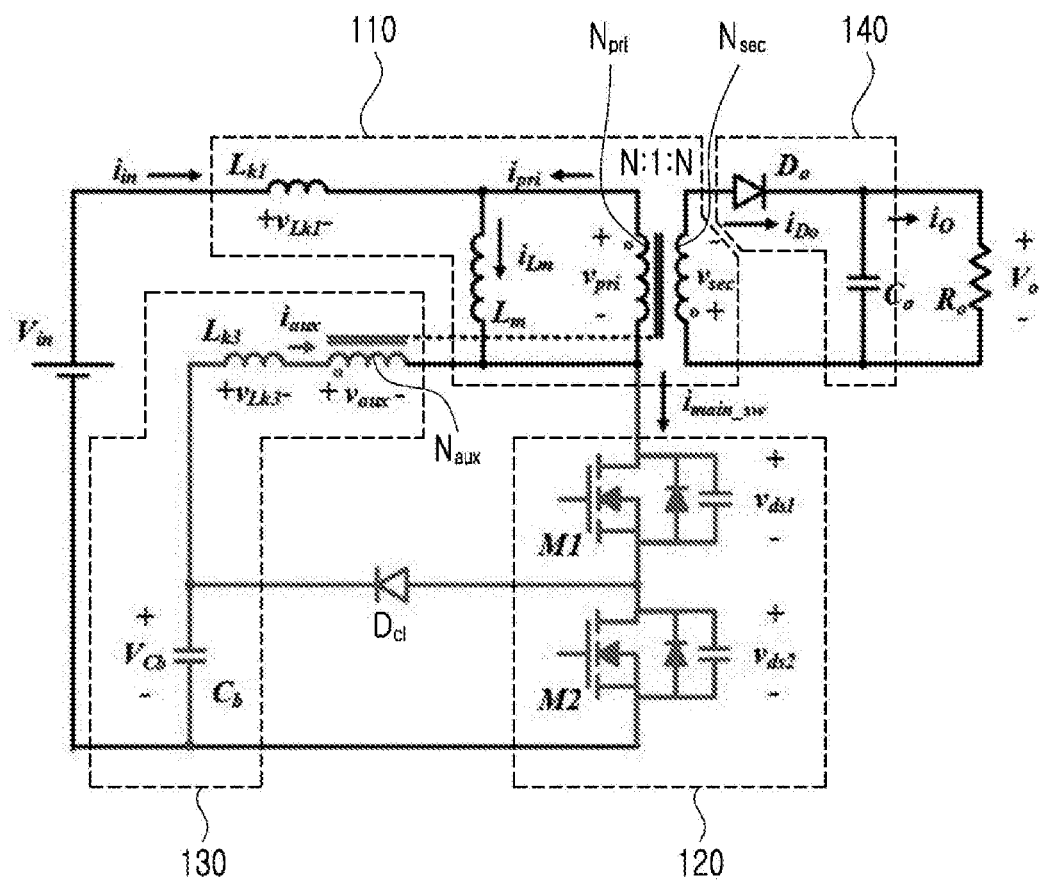
FIG. 2 is a circuit diagram showing a flyback converter according to an embodiment of the present disclosure.

FIG. 2 is a circuit diagram of a flyback converter according to an embodiment of the present disclosure.

Referring to FIG. 2, the flyback converter according to an embodiment of the present disclosure may include a transformer 110, a switching part 120, an auxiliary circuit 130, and a rectifier 140.

The transformer 110 includes a primary winding $N_{pri}$ and a secondary winding $N_{sec}$, and transforms an input power $V_{in}$ according to the switching operation of the switching part 120 by a winding ratio (N:1) set by the number of windings of the primary winding $N_{pri}$ and the secondary winding $N_{sec}$ and outputs the transformed power.

The primary winding $N_{pri}$ may have a leakage inductance $L_{k1}$ and a magnetizing inductance $L_m$.

The switching part 120 may have one end connected to the primary winding $N_{pri}$ and the other end connected to a ground of the input power supply $V_{in}$. The switching part 120 may include a first switch M1 and a second switch M2 that are connected to each other in series.

The first switch M11 and the second switch M12 may be implemented as a power field effect transistor (FET), or may be implemented as other power switch devices such as MOSFET and so on, depending on embodiments.

The auxiliary circuit 130 includes an auxiliary winding $N_{aux}$ coupled to the primary winding $N_{pri}$ and an auxiliary capacitor $C_b$ and may be connected in parallel to the switching part 120 in parallel.

One end of the auxiliary winding $N_{aux}$ may be connected to a contact of the primary winding $N_{pri}$ and the switching part 120 and the other end may be connected to the auxiliary capacitor $C_b$.

The auxiliary winding $N_{aux}$ may have the leakage inductance $L_{k3}$.

The auxiliary winding $N_{aux}$ has the same number of windings (N) as the primary winding $N_{pri}$ and may be connected so that the polarity is opposite to one of the secondary winding.

One end of the auxiliary capacitor $C_b$ may be connected to the other end of the switching part 120 and the other end may be connected to the auxiliary winding $N_{aux}$.

The flyback converter according to the present disclosure may further include a clamping diode $D_{cl}$ for connecting a contact of the auxiliary winding $N_{aux}$ and the auxiliary capacitor $C_b$ to a contact of the first switch M1 and the second switch M2. Specifically, an anode of the clamping diode $D_{cl}$ may be connected to the contact of the first switch M1 and the second switch M2, and a cathode of the clamping diode $D_{cl}$ may be connected to the contact of the auxiliary winding $N_{aux}$ and the auxiliary capacitor $C_b$.

The rectifier 140 may rectify the power outputted from the transformer 110 and output the rectified power to the load $R_o$ and may include an output diode $D_o$ and an output capacitor $C_o$.

Figure 3:
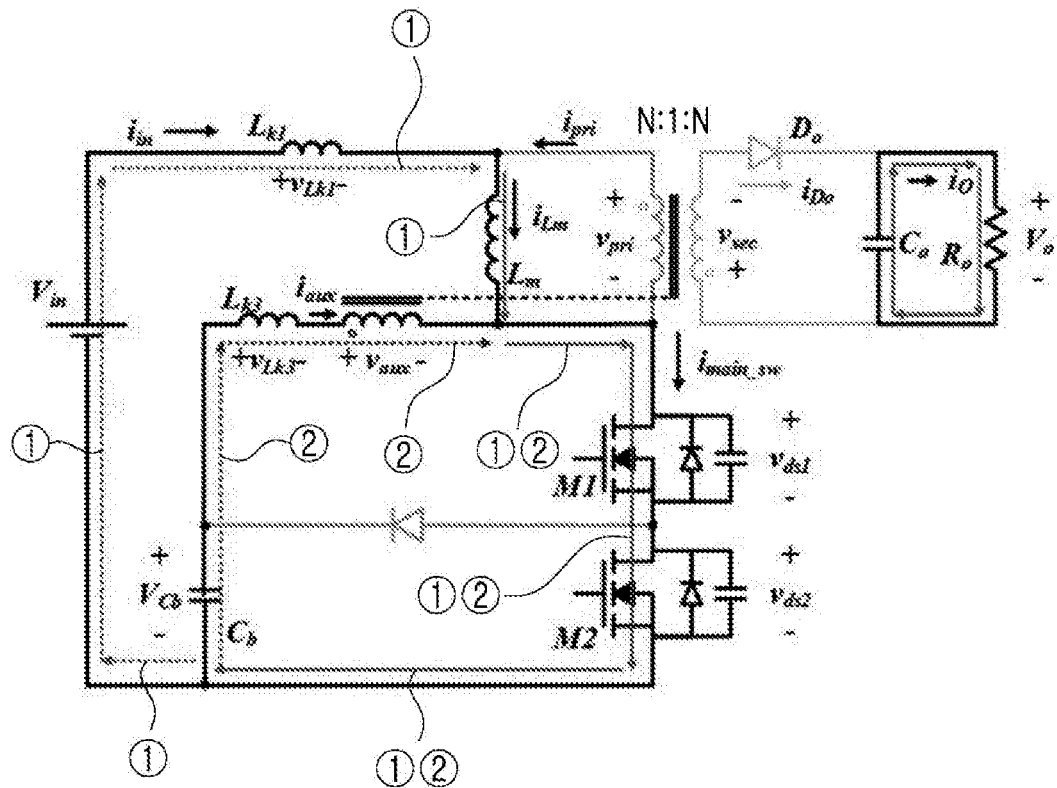
FIG. 3 is a diagram illustrating a conduction path in a first mode of a flyback converter circuit according to an embodiment of the present disclosure.

FIG. 3 is a diagram illustrating a conduction path in a first mode of a flyback converter circuit according to an embodiment of the present disclosure.

Referring to FIG. 3, the flyback converter circuit according to an embodiment of the present disclosure may have a current conduction path as illustrated in FIG. 3 in a first mode in which the switching part 120 is turned on (i.e., both the first switch M1 and the second switch M2 are turned on).

In the first mode, there are two conduction paths ① and ② on the primary circuit side. In addition, in the first mode, energy is stored in the magnetizing inductance $L_m$ of the transformer 110.

In the first mode, the first conduction path ① includes the input power $V_{in}$, the primary side of the transformer 110, the switching part 120, and the input power $V_{in}$, and the second conduction path 2 includes the auxiliary capacitor $C_b$, the auxiliary winding $N_{aux}$, the switching part 120, and the auxiliary capacitor $C_b$.

In the first mode, the current conduction path on the secondary circuit side includes an output capacitor $C_o$, a load $R_o$, and an output capacitor $C_o$.

The main voltage in the first mode is described below.

For the primary-side voltage of the transformer 110, the input voltage $V_{in}$ is divided and applied to the leakage inductance $L_{k1}$ and the magnetizing inductance $L_m$. The voltage $V_{pri}$ across both ends of the magnetizing inductance $L_m$ is equal to the voltage $V_{aux}$ applied to the auxiliary winding $N_{aux}$.

In addition, the voltage $V_{Cb}$ applied to the primary-side auxiliary capacitor $C_b$ is equal to the input voltage $V_{in}$. The voltage $V_{Cb}$ is divided and applied to the leakage inductance $L_{k3}$ and the auxiliary winding $N_{aux}$.

The voltages $V_{Lk1}$ and $V_{Lk3}$ of the primary-side and the auxiliary-side leakage inductances $L_{k1}$ and $L_{k3}$ are also equal to each other.

The secondary-side voltage $V_{sec}$ of the transformer 110 is 0 V due to the output diode $D_o$ on the secondary circuit side blocking the current flow.

In the first mode, the currents of the primary side and the secondary side are expressed as follows.

Primary-Side Current:

$$i_{main\_sw}(t)=i_{Lm}(t)$$

$$i_{Lm}(t)=i_{in}(t)+i_{aux}(t)$$

The slopes of the inductor currents are inversely proportional to the inductances, when the same voltages are applied to $L_{k1}$ and $L_{k3}$. Therefore, when $L_{k1} \gg L_{k3}$, an amount of variations of $i_{in}$ is significantly smaller than that of $f_{aux}$. Thus, when $L_{k1}/L_{k3}$ is sufficiently large, $i_{in}$ flows similarly to DC current with a significantly reduced ripple, while the remainder of ripple current flows through the auxiliary winding.

Secondary-Side Current:

$$i_{Do}=0$$

where, $i_o(t)$ is a discharge current of the output capacitor $C_o$, and its slope is determined by the output resistance $R_o$ and the output capacitor $C_o$.

Figure 4:
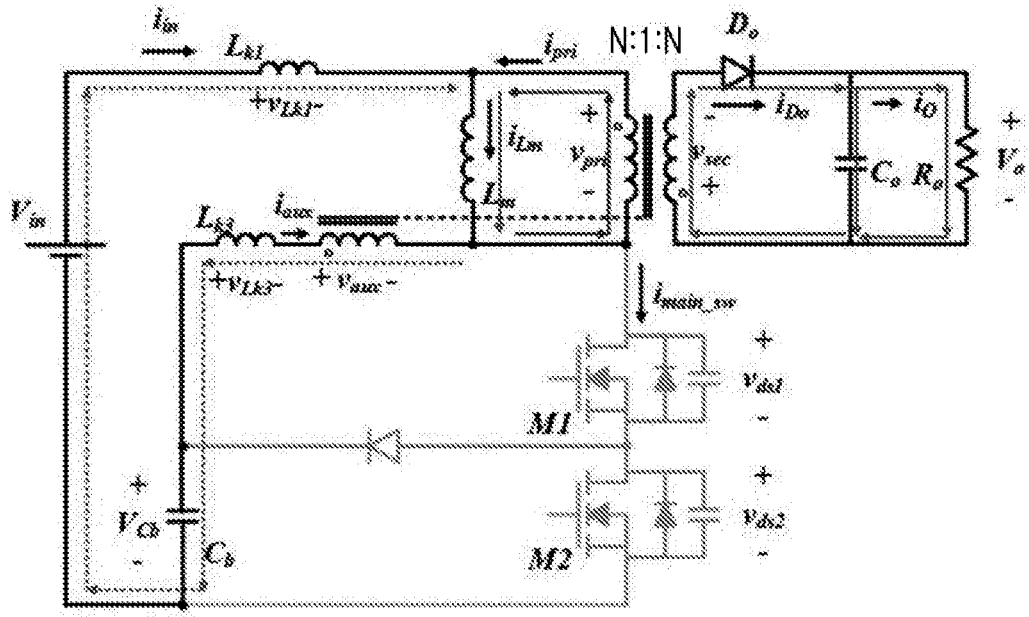
FIG. 4 is a diagram illustrating a conduction path in a second mode of a flyback converter circuit according to an embodiment of the present disclosure.

FIG. 4 is a diagram illustrating a conduction path in a second mode of a flyback converter circuit according to an embodiment of the present disclosure.

Referring to FIG. 4, in the flyback converter circuit according to the embodiment of the present disclosure, the primary circuit side and the secondary circuit side may have the current conduction paths as shown in FIG. 4, respectively, in the second mode in which the switching part 120 is turned off (i.e., both the first switch M1 and the second switch M2 are turned off). The energy stored in the magnetizing inductance $L_m$ of the transformer 110 is transferred to the secondary circuit side.

In the second mode, the conduction path on the primary circuit side includes the input power $V_{in}$, the primary side of the transformer 110, the auxiliary winding $N_{aux}$, the auxiliary capacitor $C_b$, and the input power $V_{in}$, and the current conduction path on the secondary circuit side includes the secondary side of the transformer 110, the output diode $D_o$, the (output capacitor $C_o$//load $R_o$) and the secondary side of the transformer 110.

When the switching part 120 is turned off, the input current $i_{in}$ flows to the auxiliary winding $N_{aux}$ to charge the auxiliary capacitor $C_b$ for achieving the current-second balance of $C_b$. Therefore the current $i_{in}$ and current $i_{aux}$ have the same magnitude according to the Kirchhoff's Current Law (KCL). In addition, the voltage across both ends of the magnetizing inductance $L_m$ is a negative value so that the secondary side output diode $D_o$ is in conductive state, in which case the energy stored in the magnetizing inductance $L_m$ is transferred to the secondary side so that the current $i_{Lm}$ decreases to the initial value of the first mode to achieve the voltage-second balance of $L_m$.

The main voltage in the second mode is as follows.
Primary-side transformer voltage: $V_{pri}=V_{aux}=-V_o/N$
Voltage $V_{Cb}$ of the primary-side auxiliary capacitor $C_b$ is equal to $V_{in}$
Voltage $V_{Lk1}$ of the primary-side leakage inductance is equal to $V_{Lk3}$ of the auxiliary-side leakage inductance
Voltage $V_{ds}$ of the primary-side switching part: $V_{in}-(V_{pri}V_{Lk1})$ The voltage $V_{ds}$ of the primary-side switching part is divided and applied to the first switch M1 and the second switch M2 as $V_{ds1}$ and $V_{ds2}$, respectively.
Voltage $V_{sec}$ on the secondary side: $-V_O$
In the first mode, the currents of the primary side and the secondary side are expressed as follows.
Primary-Side Current:

$$i_{main\_sw}(t)=0$$

$$i_{Lm}(t)=i_{pri}(t)+i_{in}(t)+i_{aux}(t)$$

$$i_{in}=-i_{aux}(t)$$

The current $f_{aux}$ of the auxiliary winding $N_{aux}$ flows toward the auxiliary capacitor $C_b$ at a constant value to charge the auxiliary capacitor $C_b$. In other words, the input current $i_{in}$ flows at a constant value like a direct current (DC).
Secondary-Side Current:

$$i_{Do}(t)=i_{pri}(t) \cdot N$$

Figure 5:
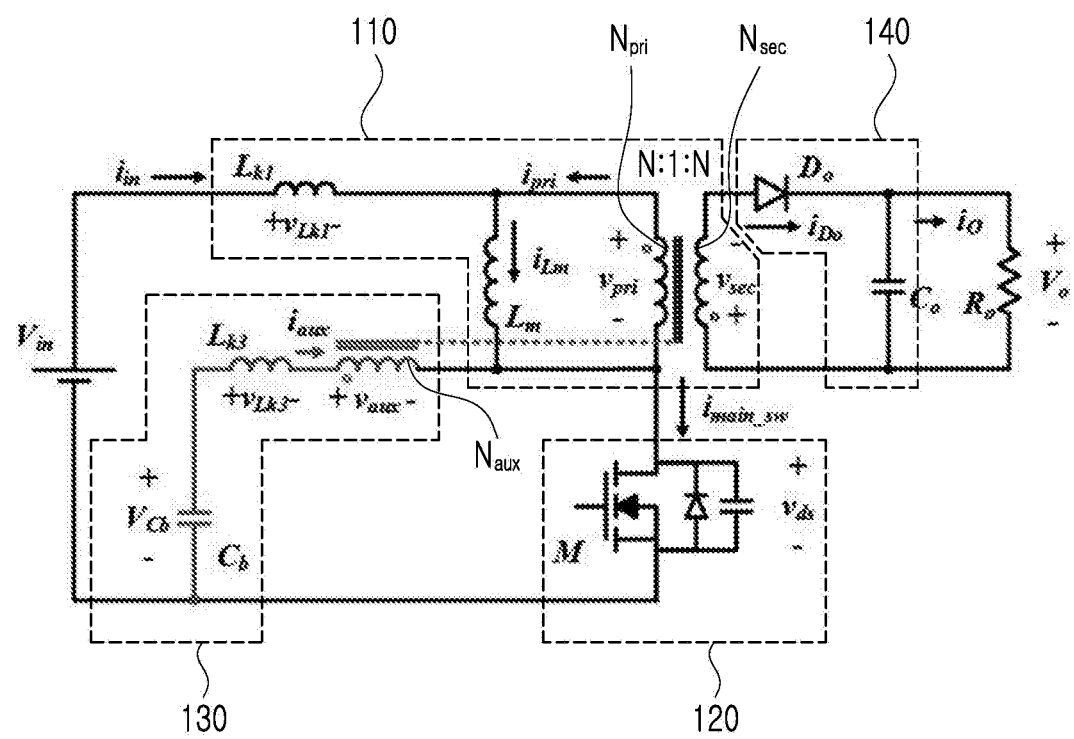
FIG. 5 is a circuit diagram showing a flyback converter according to another embodiment of the present disclosure.

FIG. 5 is a circuit diagram showing a flyback converter according to another embodiment of the present disclosure.

Referring to FIG. 5, likewise the flyback converter according to the embodiment illustrated in FIG. 2, the flyback converter according to another embodiment may include a transformer 110, a switching part 120, an auxiliary circuit 130, and a rectifier 140. The only difference from the embodiment of FIG. 2 is that the switching part 120 includes one switch M and the clamping diode $D_{cl}$ is not included.

Figure 6:
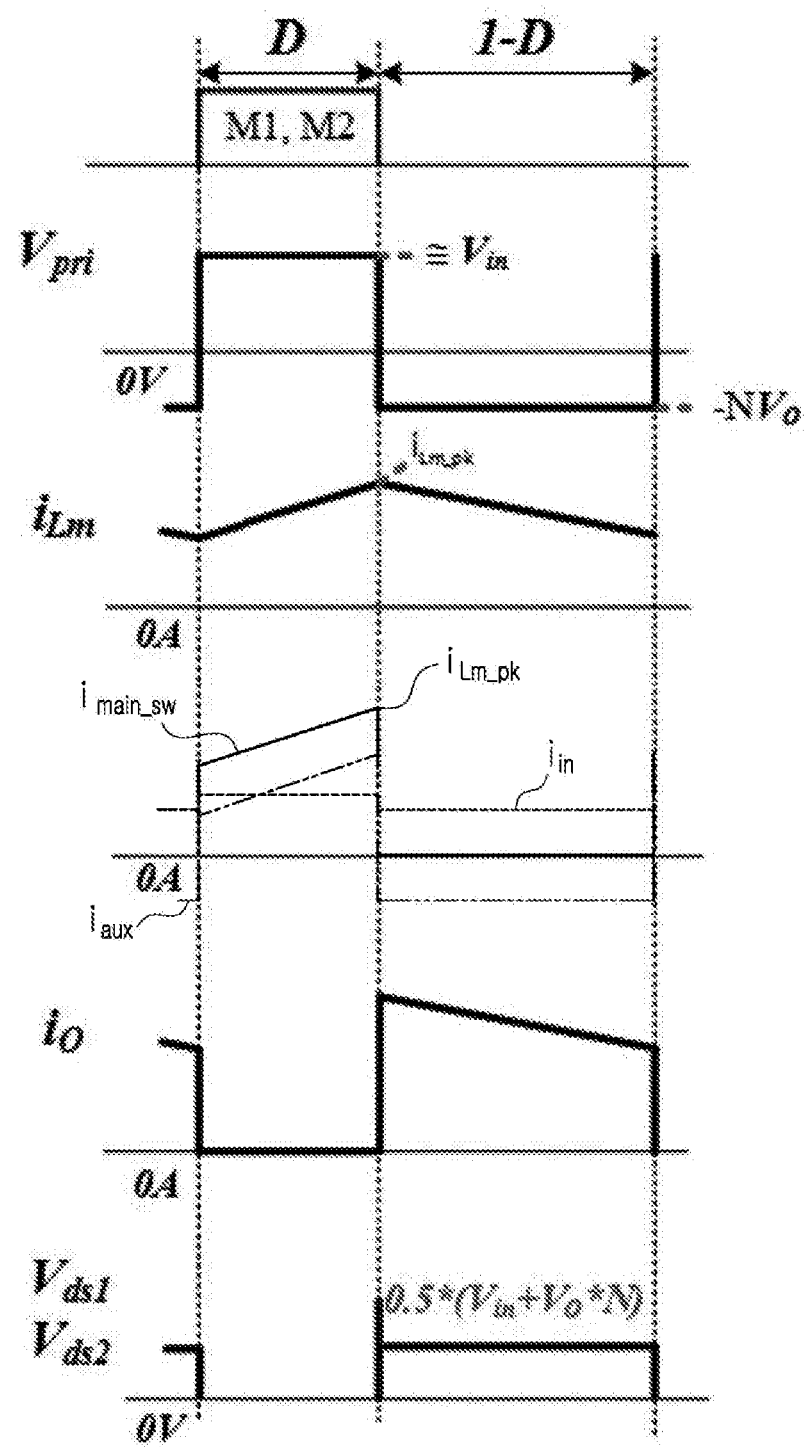
FIG. 6 is a diagram showing the main operation waveforms of the flyback converter circuit of FIG. 2.
Figure 7:
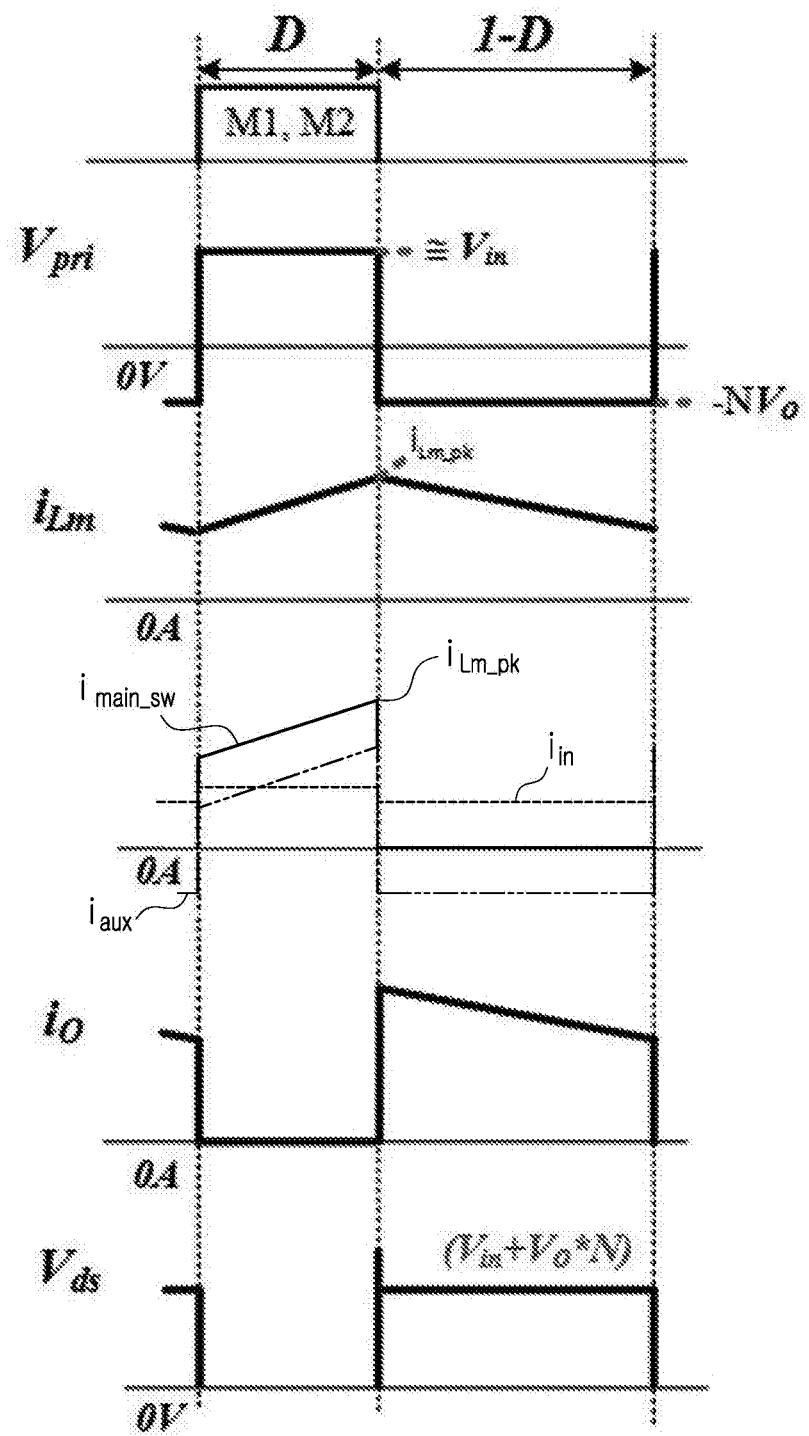
FIG. 7 is a diagram showing the main operation waveforms of the flyback converter circuit of FIG. 5.

FIG. 6 is a diagram showing the main operation waveforms of the flyback converter circuit of FIG. 2. FIG. 7 is a diagram showing the main operation waveforms of the flyback converter circuit of FIG. 5.

Referring to FIGS. 6 and 7, the main operation waveform of the flyback converter according to the embodiments illustrated in FIGS. 2 and 5 can be observed in the first mode in which the switches M, M1, and M2 are turned on for the time period D and in the second mode in which the switches M, M1, and M2 are turned off for the time period 1-D.

The ripple of the input current $i_{in}$ is greatly reduced and the current flows continuously like a direct current (DC). Meanwhile, voltage stresses of the main switches in the FIG. 2 are clamped to '$0.5*(V_{in}+NV_o)$', respectively, which are relieved to the half level comparing to one of FIG. 5.

Figure 8A:
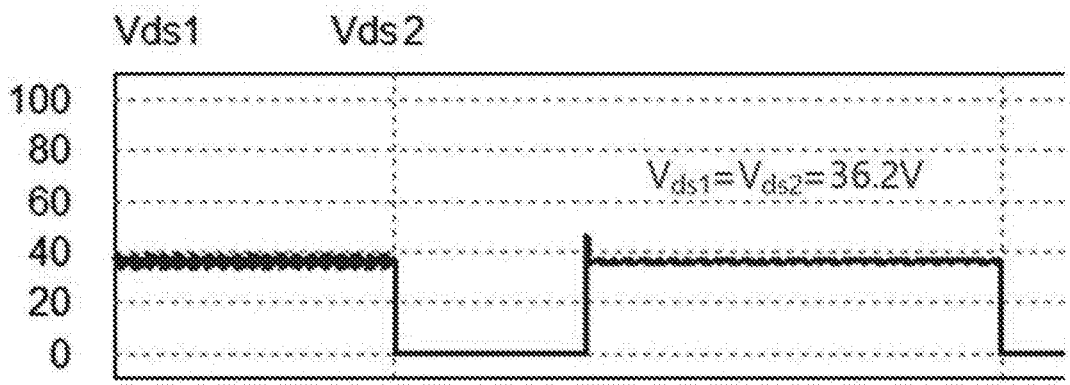
FIG. 8A-8C are diagrams showing simulation results of an input current and a switch voltage of a flyback converter circuit according to the present disclosure.
Figure 8B:
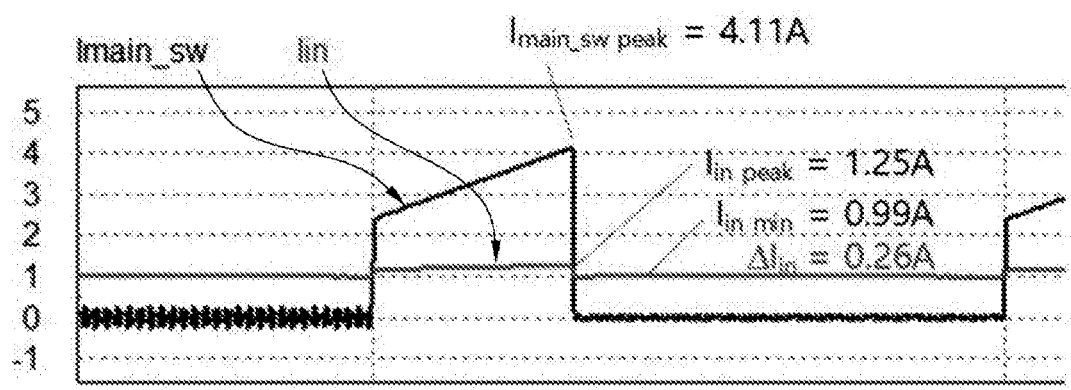
Figure 8C:
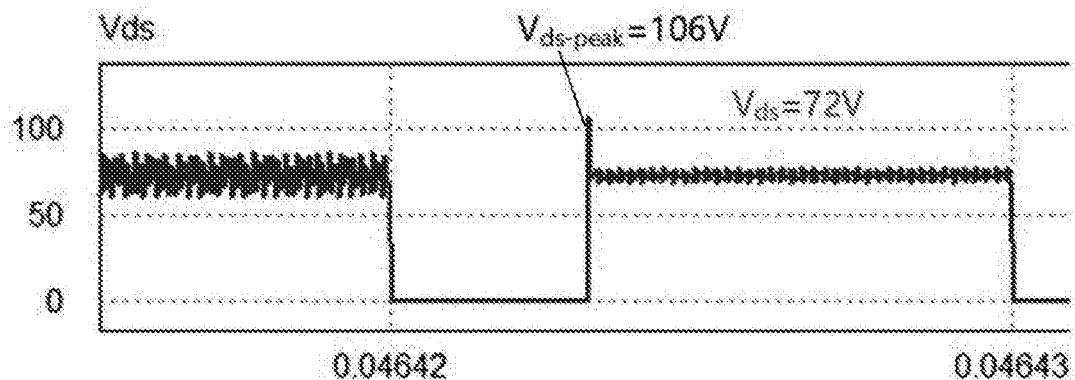
Figure 9A:
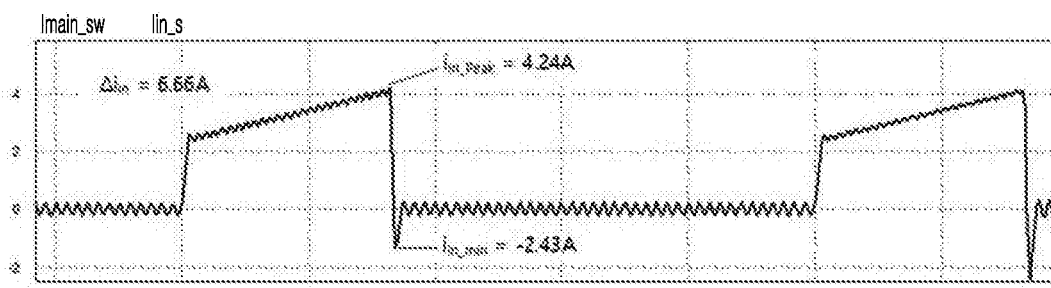
FIG. 9A-9B are diagrams showing simulation results of an input current and a switch voltage of the conventional flyback converter.
Figure 9B:
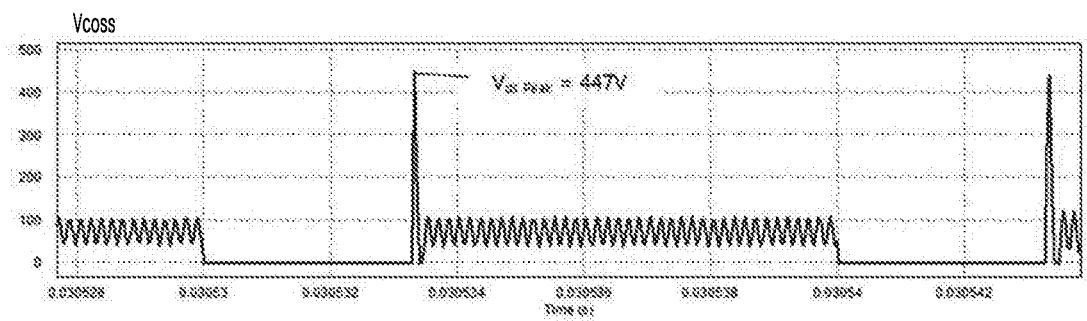

FIG. 8A-8C are diagrams showing simulation results of an input current and a switch voltage of a flyback converter circuit according to the present disclosure. FIG. 9A-9B are diagrams showing simulation results of an input current and a switch voltage of a conventional flyback converter circuit.

FIG. 8A shows the simulation result of the input current $i_{in}$ of the flyback converter circuit according to the present disclosure, FIG. 8B shows the simulation result of the switch voltage of the flyback converter circuit of FIG. 2, and FIG. 8C shows the simulation result of the switch voltage of the flyback converter circuit of FIG. 5. In addition, FIG. 9A shows the simulation result of the input current $i_{in}$ of a conventional flyback converter circuit, and FIG. 9B shows the simulation result of the switch voltage of the conventional flyback converter circuit.

It can be seen that the ripple of the input current $i_{in}$ in the flyback converter according to the present disclosure is greatly reduced compared to the ripple of the input current $i_{in}$ in the conventional flyback converter and that the current flows continuously like DC. Also it can be seen that the voltage stress of the switch in the flyback converter according to the present disclosure is relieved to the half level as compared with the conventional flyback converter.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A flyback converter, comprising:
a transformer comprising a primary winding and a secondary winding, the transformer for transforming a power inputted from an input power supply and outputting the transformed power;
a switching part having one end connected to the primary winding and another end connected to a ground of the input power supply;
an auxiliary circuit including an auxiliary capacitor, and an auxiliary winding coupled to the primary winding; and
a clamping diode,
wherein the auxiliary circuit is connected to the switching part in parallel,
wherein the auxiliary capacitor and the auxiliary winding are connected to each other in series, wherein the auxiliary winding is connected to a contact of the primary winding and the switching part, and one end of the auxiliary capacitor is connected to the other end of the switching part, wherein the switching part includes a first switch and a second switch connected to each other in series, an anode of the clamping diode is connected to a contact of the first switch and the second switch, and a cathode of the clamping diode is connected to a contact of the auxiliary winding and the auxiliary capacitor, and wherein a voltage applied to the auxiliary capacitor is equal to a input voltage of the input power supply.

2. The flyback converter according to claim 1, wherein the auxiliary winding and the primary winding have a same number of windings.

3. The flyback converter according to claim 1, wherein the flyback converter is operated based on a first mode and a second mode, and in the first mode, the switching part is turned on and energy is stored in a magnetizing inductance of the transformer, and in the second mode, the switching unit is turned off and the energy stored in the magnetizing inductance of the transformer is transferred to a secondary side.

* * * * *